(12) United States Patent
Sterling (10) Patent No.: US 11,642,728 B2
(45) Date of Patent: May 9, 2023

(54) TWIST DRILL AND AN EXCHANGEABLE HEAD FOR A TWIST DRILL

(71) Applicant: SECO TOOLS AB, Fagersta (SE)

(72) Inventor: Bjorn Sterling, Soderkoping (SE)

(73) Assignee: SECO TOOLS AB, Fagersta (SE)

( * ) Notice: Subject to any disclaimer, the term of this patent is extended or adjusted under 35 U.S.C. 154(b) by 601 days.

(21) Appl. No.: 16/473,488

(22) PCT Filed: Nov. 27, 2017

(86) PCT No.: PCT/EP2017/080437
§ 371 (c)(1),
(2) Date: Jun. 25, 2019

(87) PCT Pub. No.: WO2018/121945
PCT Pub. Date: Jul. 5, 2018

(65) Prior Publication Data
US 2021/0283696 A1    Sep. 16, 2021

(30) Foreign Application Priority Data
Dec. 28, 2016   (EP) .................................... 16207128

(51) Int. Cl.
*B23B 51/02*   (2006.01)
*B23B 51/06*   (2006.01)

(52) U.S. Cl.
CPC .............. *B23B 51/02* (2013.01); *B23B 51/06* (2013.01); *B23B 2251/043* (2013.01); *B23B 2251/082* (2013.01); *B23B 2251/14* (2013.01); *B23B 2251/18* (2013.01); *B23B 2251/50* (2013.01)

(58) Field of Classification Search
CPC ... B23B 51/02; B23B 51/06; B23B 2251/043; B23B 2251/14; B23B 2251/18; B23B 51/50; B23B 2251/082
See application file for complete search history.

(56) References Cited

U.S. PATENT DOCUMENTS

| 4,065,224 A | 12/1977 | Siddall |
| 4,948,306 A * | 8/1990 | Wiedner ................. B23B 51/00 408/229 |
| 5,230,593 A | 7/1993 | Imanaga et al. |

(Continued)

FOREIGN PATENT DOCUMENTS

EP     2913131 A1    9/2015

*Primary Examiner* — Alan Snyder
(74) *Attorney, Agent, or Firm* — Corinne R. Gorski (57) ABSTRACT

A twist drill and an exchangeable head for a twist drill, the twist drill extending along a central axis of rotation and having a front end formed as a drill point with two cutting edges and at least two clearance surfaces. Two helical chip flutes conduct chips away from the cutting edges. Each cutting edge extends in a transition between the clearance surfaces. One of the chip flutes extends from an inner position adjacent to the central axis to a peripheral envelope surface and has a main portion closest to the peripheral envelope surface. Each chip flute is delimited by a side surface including a main rake face, which extends rearward from the main portion of the cutting edge. The cutting edges are contained in an imaginary conical surface, such that the twist drill is operable to generate a bottom profile having the shape of an inverted cone.

9 Claims, 6 Drawing Sheets

(56) References Cited

U.S. PATENT DOCUMENTS

| | | | |
|---|---|---|---|
| 2002/0085891 A1* | 7/2002 | Moore | B23B 51/108 |
| | | | 408/230 |
| 2003/0039522 A1* | 2/2003 | Yanagida | B23B 51/02 |
| | | | 408/230 |
| 2008/0089753 A1* | 4/2008 | Takikawa | B23B 51/02 |
| | | | 408/230 |
| 2010/0028098 A1* | 2/2010 | Shaffer | B23B 51/02 |
| | | | 408/230 |
| 2012/0076597 A1* | 3/2012 | Krenzer | B23B 51/02 |
| | | | 408/227 |
| 2014/0023448 A1* | 1/2014 | Yanagida | B23B 51/02 |
| | | | 408/229 |
| 2014/0301799 A1* | 10/2014 | Schwaegerl | B23B 51/02 |
| | | | 408/231 |
| 2015/0283624 A1 | 10/2015 | Jindai | |
| 2016/0256937 A1 | 9/2016 | Guter et al. | |

* cited by examiner

TWIST DRILL AND AN EXCHANGEABLE HEAD FOR A TWIST DRILL

RELATED APPLICATION DATA

This application is a § 371 National Stage Application of PCT International Application No. PCT/EP2017/080437 filed Nov. 27, 2017 claiming priority to EP 16207128.6 filed Dec. 28, 2016.

TECHNICAL FIELD OF THE INVENTION

The present invention relates to a twist drill for chip removing machining and an exchangeable head for a twist drill. The twist drill and exchangeable head are primarily intended for, but not limited to, cutting machining in workpieces of metal or composite material.

BACKGROUND AND PRIOR ART

Twist drills for chip removing machining generally have a front end forming a drill point and a rear end configured for mounting the twist drill in e.g. a machine spindle, a driving sleeve, a chuck or a socket. The rear end may e.g. be formed as a straight or tapered shank. In the front end, two cutting edges, sometimes also referred to as cutting lips, are typically provided. From each cutting edge, a helical chip flute extends in a peripheral envelope surface of the twist drill in a rearward direction. The chip flutes are configured for conducting chips away from the cutting edges during machining. The cutting edges may be straight or may follow a curved line from a chisel edge provided at a centre point of the front end to the peripheral envelope surface.

The cutting edges and the chip flutes of a twist drill may be configured for good cutting performance and optimised formation and evacuation of chips. For this purpose, the cutting edges are typically curved so that corners are avoided, which may otherwise create stress points that are prone to breaking. By providing curved cutting edges, the cutting performance and the chip formation process can be enhanced. Upon machining, such curved cutting edges generate a blindhole with a wavy bottom profile. For many applications, the generation of a wavy bottom profile has little or no significance. However, for certain applications such as hydraulic or pneumatic couplings, a well-defined blindhole is desired.

SUMMARY OF THE INVENTION

It is an objective of the present invention to provide a twist drill and an exchangeable head for a twist drill which are suitable for precision drilling, and which can achieve a blindhole having a more well-defined bottom profile.

According to a first aspect of the invention, this objective is achieved by means of the initially defined twist drill, which is characterised in that the main rake face has a concave shape as seen in a transverse cross section, and in that the cutting edges are contained in an imaginary conical surface, such that the twist drill is operable to generate a bottom profile having the shape of an inverted cone.

The curved cutting edges are configured so that each cutting edge follows a line which is curved in space and which lies on an imaginary conical surface. As seen in a side view, the main portion of the cutting edge may have a linear or a slightly convex shape, but this may vary depending on the orientation of the twist drill with respect to the viewer since the cutting edges are curved and contained in the imaginary conical surface. Preferably, the twist drill has a rotational symmetry, so that the cutting edges are identical.

Thanks to the concave shape of the main rake face as seen in a transverse cross section below the main portion of the cutting edge, i.e. in a plane perpendicular to the central axis, the cutting performance of the twist drill is enhanced in comparison with a twist drill having a convex main rake face. Furthermore, the chip evacuation is improved. The improved cutting performance and chip evacuation make it possible to increase the cutting speed and lead to an increased tool life of the twist drill.

Since the cutting edges are contained in an imaginary conical surface, the bottom profile of the generated blindhole will have a smooth bottom profile having the well-defined shape of an inverted cone. The twist drill is therefore suitable for precision drilling where a well-defined blindhole is desired, for example for hydraulic or pneumatic applications. In particular, the twist drill is suitable for making relatively shallow blindholes with a well-defined bottom profile.

The twist drill according to the invention may be in the form of a solid twist drill in a single piece, or in the form of a drill body on which an exchangeable head comprising the cutting edges is mounted. The twist drill may e.g. be manufactured from cemented carbide or steel.

According to an embodiment, as seen in a transverse cross section, the main rake face has a radius of curvature which is at least 1.5 times as large as a radius of the twist drill, preferably at least 2.0 times as large as a radius of the twist drill. As seen in a transverse cross section, the main rake face may according to one embodiment have a radius of curvature which is less than 5.0 times as large as a radius of the twist drill, preferably less than 4.7 times as large as a radius of the twist drill. Within these ranges, depending on the dimension of the twist drill, it is possible to achieve that the main portions of the cutting edges, in an upper end view, appear straight. It is thereby possible to improve the cutting performance and increase the tool life of the twist drill, in particular for machining of steel materials. The radius of curvature of the main rake face may preferably be constant along the central axis for ease of manufacture. Generally, for relatively small twist drill dimensions, such as for a twist drill having a radius of 1-2 mm, the ratio between the radius of curvature of the main rake face and the radius of the twist drill may approach 4.7 or 5.0. For larger twist drill dimensions, such as for a twist drill having a radius of 6-8 mm, the ratio may decrease toward 2.0 or 1.5. For twist drills having a larger radius, the ratio may be increased again. If the ratio becomes smaller than 1.5 or larger than 5.0, the cutting edge may in a front end view appear concave or convex, respectively.

According to an embodiment, the twist drill has an axial rake angle that varies along each cutting edge from a minimum value at the inner position to a maximum positive value at the peripheral envelope surface. Preferably, the axial rake angle varies from within the range 0°-5° at the inner position to within the range 15°-35°, more preferably 16°-32°, at the peripheral envelope surface, depending on e.g. the dimension of the twist drill. The axial rake angle is defined as the angle between an axial plane including the central axis, and a tangent plane to the rake face at a point of interest along the cutting edge, i.e., the angle that the rake face makes with the central axis at the point of interest. Within the above mentioned ranges, it is possible to design a chip flute with chip evacuation properties that are similar regardless of the diameter of the twist drill.

According to an embodiment, the front end comprises a foremost chisel edge extending through the central axis, wherein the chisel edge connects the cutting edges. The chisel edge preferably has a length of between 1-10% of the diameter of the twist drill in order to achieve a sufficiently strong chisel edge which is short enough not to affect the cutting performance of the twist drill. Preferably, the chisel edge is a linear edge.

According to an embodiment, the main portion of each cutting edge has a linear shape as seen in a front end view. The main portion thus appears to be straight as seen from the front end. This shape of the main portion makes it possible to improve the cutting performance and increase the tool life of the twist drill, in particular for machining of steel materials.

According to an embodiment, each cutting edge further includes a middle portion connected to the main portion, and an inner portion connected to the middle portion, wherein the middle portion has a convex shape as seen in a front end view. The middle portion and the inner portion prolongs the cutting edge. Preferably, a web thinning, or gash, is provided on the front end of the twist drill, such that a middle rake face is formed extending rearward from the middle portion, and an inner rake face is formed extending rearward from the inner portion. The axial rake angle may vary along the different portions of the cutting edge, but is preferably 0° or close to 0° along the middle and inner portions of the cutting edge for ease of manufacture. Due to the low cutting speed close to the central axis, the axial rake angle is less important along these portions. The inner portion of the cutting edge preferably extends from the chisel edge to the middle portion, with radial transitions on each side thereof.

According to an embodiment, the inner portion of each cutting edge has a linear shape as seen in a front end view. This facilitates the manufacturing process without affecting the cutting performance of the twist drill. An inner rake surface extending rearward from the inner portion preferably extends from the inner portion at an axial rake angle of 0° or close to 0°, i.e. in parallel or essentially in parallel with the central axis.

According to a second aspect of the invention, the above objective is achieved by means of the initially defined exchangeable head for a twist drill, which is characterised in that the main rake face has a concave shape as seen in a transverse cross section, and in that the cutting edges are contained in an imaginary conical surface, such that, when the exchangeable head is mounted on a drill body to form a twist drill, the twist drill is operable to generate a bottom profile having the shape of an inverted cone. Advantages of such an exchangeable head correspond to those mentioned above in conjunction with the twist drill. Furthermore, it will be appreciated that all the embodiments described with reference to the first aspect of the present invention are applicable also for the second aspect of the present invention. That is, the exchangeable head may be configured according to any one of the embodiments described above.

A twist drill according to the invention may comprise a drill body and the proposed exchangeable head mounted in a front seat of the drill body, wherein the drill body extends rearward from the exchangeable head along the central axis. In such a twist drill, the exchangeable head can be replaced when worn, thereby reducing costs and material waste since the drill body is generally subjected to less heavy wear than the front end of the twist drill.

Further advantageous features and advantages of the invention will appear from the following detailed description.

BRIEF DESCRIPTION OF THE DRAWINGS

Embodiments of the invention will in the following be described by means of example with reference to the appended drawings, in which.

DETAILED DESCRIPTION OF EMBODIMENTS OF THE INVENTION

Figure 1:
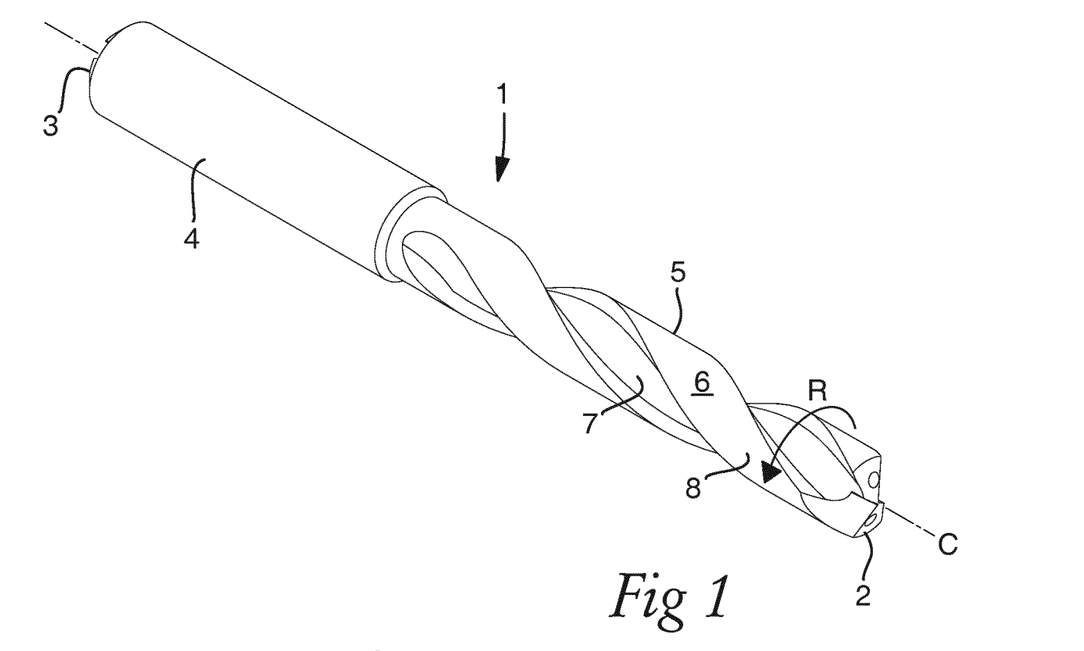
FIG. 1 is a simplified perspective view of a twist drill according to an embodiment of the invention.
Figure 2:
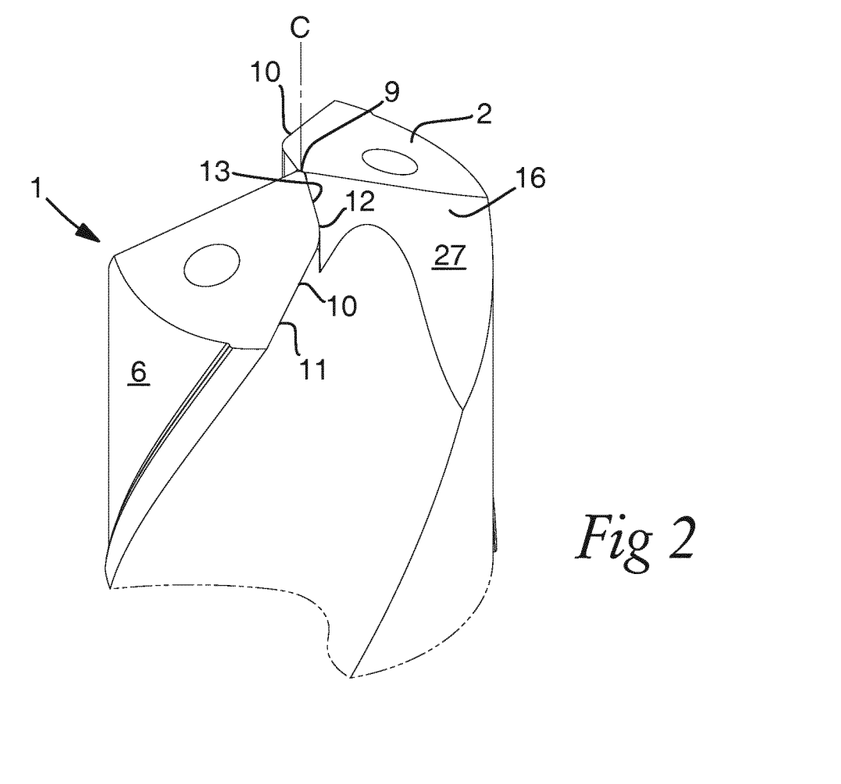
FIG. 2 is a perspective view of a front part of the twist drill in FIG. 1.

A twist drill 1 according to an embodiment of the invention is schematically shown in FIG. 1. The twist drill 1 extends along a central axis C of rotation, around which the twist drill is rotatable in a direction R. The twist drill 1 has a front end 2 forming a drill point, and a rear end 3 configured for mounting the twist drill in e.g. a machine spindle, a driving sleeve, a chuck or a socket. The rear end 3 for this purpose includes a shank 4. Between the front end 2 and the rear end 3, a drill body 5 having a peripheral envelope surface 6 extends. Two helical chip flutes 7 extend in the peripheral envelope surface 6. The peripheral envelope surface 6 comprises a land 8 separating the chip flutes 7.

The twist drill 1 is here illustrated as a twist drill formed in one piece, but it may also be configured as a drill body having a shank for mounting it in e.g. a spindle of a machine, and having an exchangeable head mounted in a front seat of the drill body. The exchangeable head may in that case, on its front part, comprise all features that will be discussed in the following with reference to FIGS. 2-10. A rear end of the exchangeable head comprises means for fitting the exchangeable head in the front seat of the drill body, e.g. in the form of male/female engagement means.

A front part including the front end 2 of a twist drill 1 shown in FIG. 1 is shown in closer detail in FIGS. 2-10. On the front end 2, a central chisel edge 9 extends through the central axis C. From an outer end of the chisel edge 9, a curved cutting edge 10, also known as a cutting lip, extends toward the peripheral envelope surface 6 of the twist drill 1. The twist drill 1 has a point angle P of approximately 140°. This may be varied depending on the dimension of the twist drill and its intended applications.

The twist drill 1 is rotationally symmetric with two curved cutting edges 10, two chip flutes 7, etc. For clarity, only one side of the twist drill 1 will be discussed and, therefore, only one set of elements will be discussed with the understanding that the other set of elements are symmetric with the first set of elements in the pair.

Figure 7:
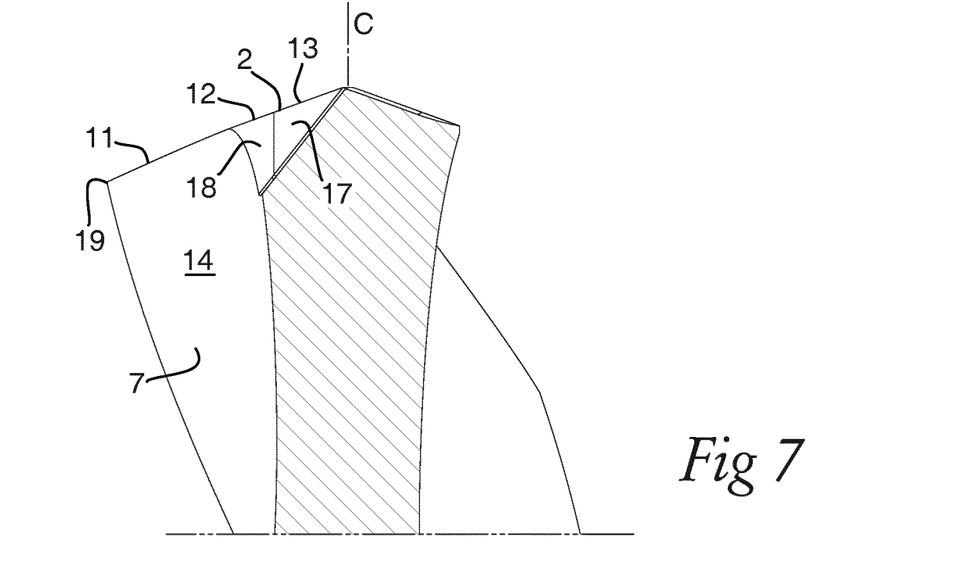
FIG. 7 is a cross sectional view along the line VII-VII in FIG. 4.

The cutting edge 10 has a main portion 11, a middle portion 12 and an inner portion 13. As shown in FIG. 7, the main portion 11 is formed in a transition between a main rake face 14 of the helical chip flute 7 and a clearance surface 15 provided on the front end 2. It extends from the peripheral envelope surface 6 in a direction toward the central axis C. The middle portion 12 is on one end connected to the main portion 11 and on another end connected to the inner portion 13, which in turn extends to an outer end of the chisel edge 9. The middle portion 12 of the cutting edge 10 is thus provided radially inside of the main portion 11 and radially outside of the inner portion 13. Radial transitions are provided between the neighbouring portions 11, 12, 13 of the cutting edge 10.

A gash 16 is provided at the front end of the twist drill 1, located ahead of the cutting edge 10 in the direction of rotation R, such that the chip flute 7 is widened and a total length of the cutting edge 10 is increased, while the chisel edge 9 is shortened. The gash 16 may in the shown embodiment be formed in two successive grinding operations. In the first operation, an inner rake face 17 is formed as well as a surface 27 extending at a right angle with respect to the inner rake face 17. The inner portion 13 of the cutting edge 10 is formed in a transition between the inner rake face 17 and the clearance surface 15. In the second operation, a middle rake face 18 is formed, connecting the inner rake face 17 and the main rake face 14. The middle portion 12 of the cutting edge 10 is formed in a transition between the middle rake face 18 and the clearance surface 15.

Figure 3:
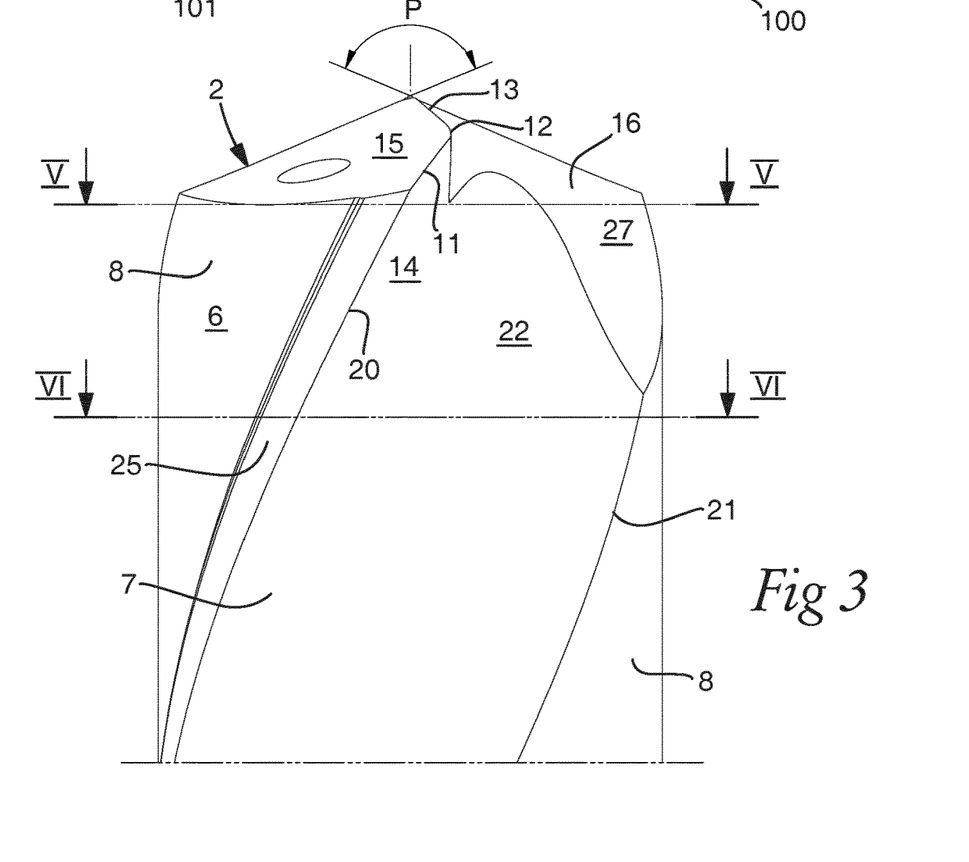
FIG. 3 is a side view of the front part in FIG. 2.
Figure 4:
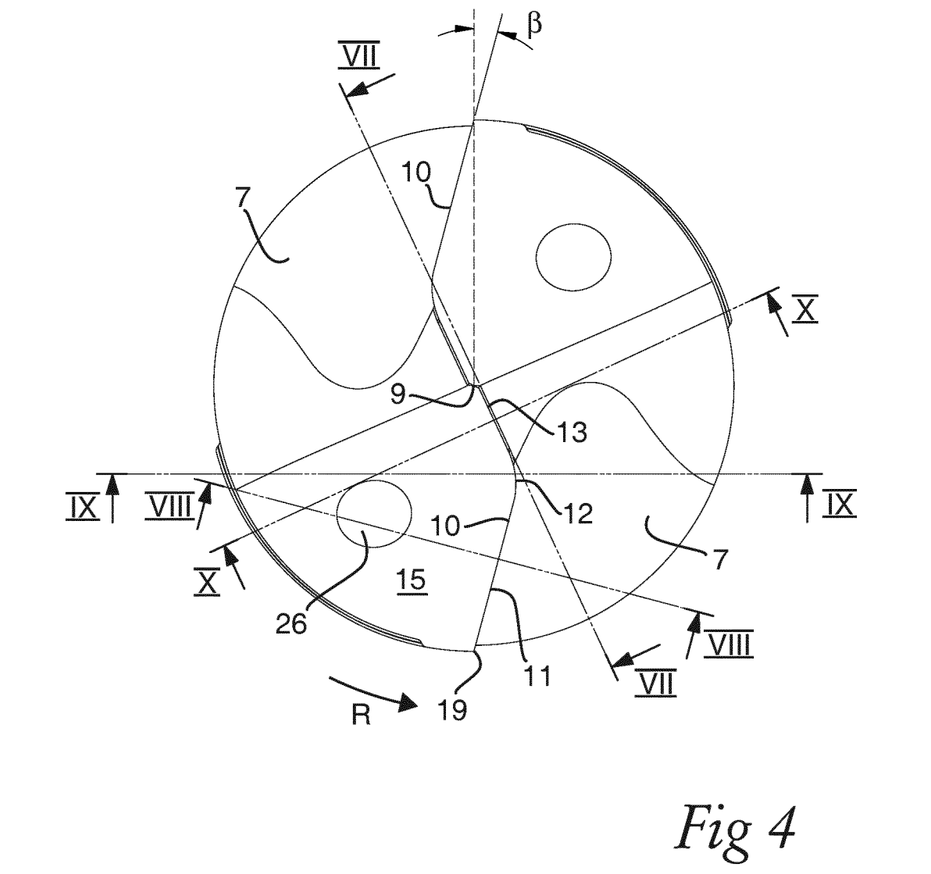
FIG. 4 is a front end view of the twist drill in FIG. 1.

The cutting edge 10, including the main portion 11, the middle portion 12 and the inner portion 13, is curved in space so that it is completely contained within an imaginary conical surface. In a front end view, such as shown in FIG. 4, the main portion 11 and the inner portion 13 appear straight, and the middle portion 12 appears convex. As the twist drill 1 is rotated during machining of a workpiece 100, as shown in FIG. 3, the cutting edge 10 will generate a blindhole 101 having a smooth bottom profile 102 which has the shape of an inverted cone. The main portion 11 of the cutting edge 10 appears, as seen in a front end view as shown in FIG. 4, to be formed at an angle β with respect to a radius of the twist drill 1. In the shown embodiment, the angle β is approximately 15°.

Figure 8:
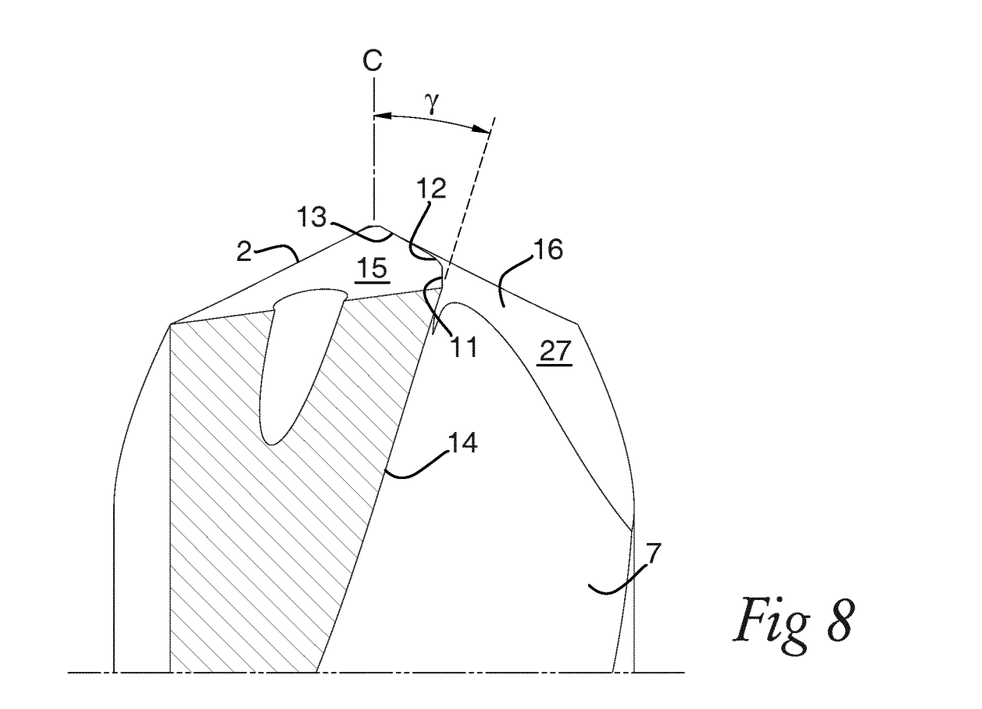
FIG. 8 is a cross sectional view along the line VIII-VIII in FIG. 4.
Figure 9:
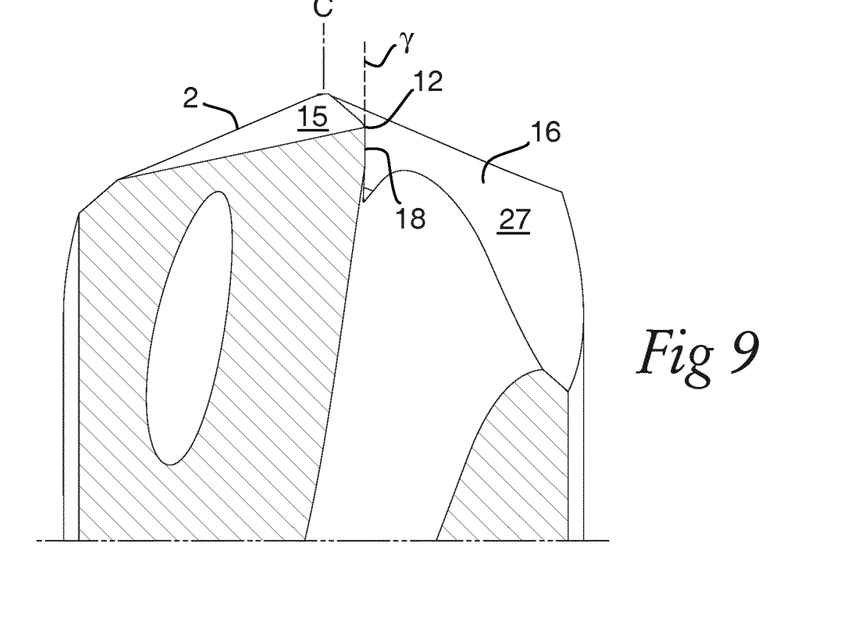
FIG. 9 is a cross sectional view along the line IX-IX in FIG. 4.
Figure 10:
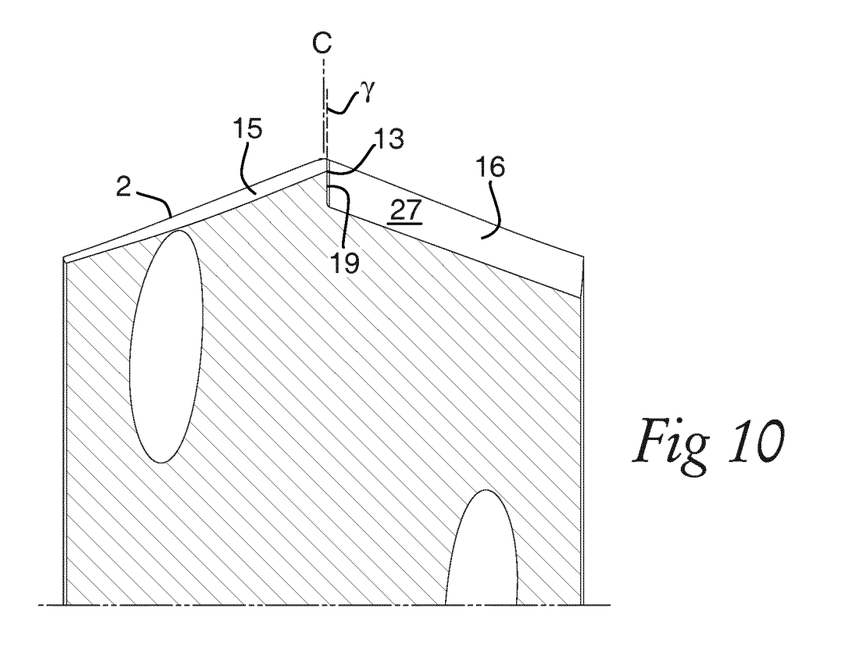
FIG. 10 is a cross sectional view along the line X-X in FIG. 4.

FIGS. 8-10 show an axial rake angle γ of the twist drill 1. The axial rake angle γ is along the main portion 11 of the cutting edge 10 closely associated with a helix angle (not shown) of the chip flute 7. It coincides with the helix angle at an outer end 19 of the main portion 11, where the main portion 11 meets the peripheral envelope surface 6. As a consequence of the helical chip flute 7, the axial rake angle γ decreases from a maximum value at the outer end 19 of the main portion 11 to a minimum value close to the middle portion 12 of the cutting edge 10. The maximum value is preferably between 15°-35° and in the shown embodiment approximately 25°. At the position of the cross sectional view in FIG. 8, the axial rake angle γ is approximately 17°. The axial rake angle γ along the main portion 11 generally depends on the radius $r_1$ of the twist drill 1, which is in the shown embodiment approximately 4.5 mm. Along the middle portion 12 of the cutting edge 10, the axial rake angle γ is in the shown embodiment close to 0°. In other words, the middle portion 12 extends in parallel or essentially in parallel with the central axis C.

Figure 5:
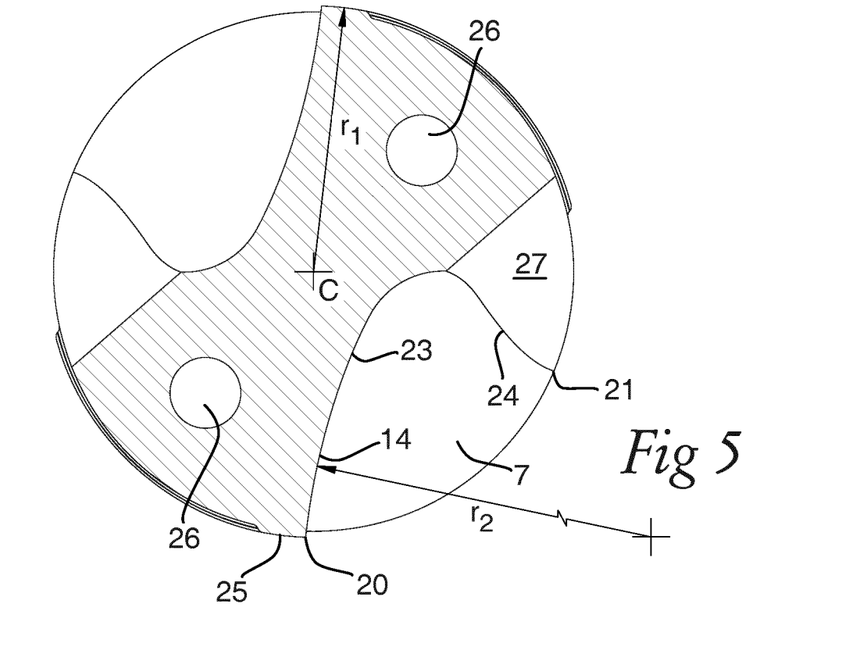
FIG. 5 is a cross sectional view along the line V-V in FIG. 3.
Figure 6:
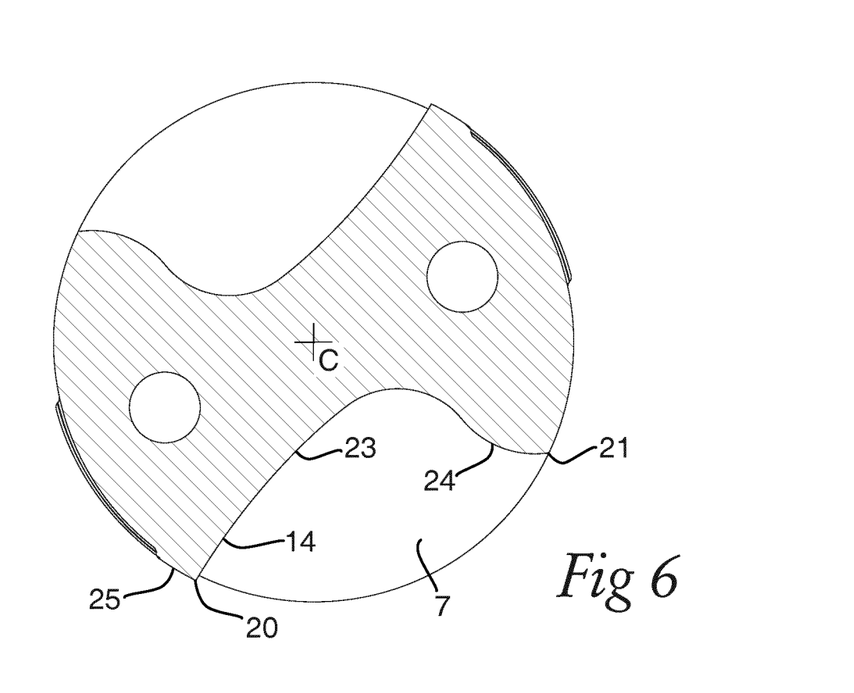
FIG. 6 is a cross sectional view along the line VI-VI in FIG. 3.

The chip flute 7 is formed between a leading edge 20 and a heel 21 of the land 8 and is delimited by a side surface 22 including the main rake face 14 formed close to the leading edge 20 of the land 8. In a transverse cross sectional view such as shown in FIGS. 5-6, the side surface 22 has a concave portion 23, including the main rake face 14, extending from the leading edge 20 of the land 8 to a position between the leading edge 20 and the heel 21. Close to the heel 21, a convex portion 24 is provided, such that the chip flute 7 has what is often referred to as a rolled heel, provided for improved chip evacuation. Of course, the chip flute 7 may have a different shape, such as without the convex portion 24 near the heel 21, as long as the main rake face 14 has a concave shape as seen in a transverse cross section. The main rake face 14 preferably has a radius of curvature $r_2$ that is between 1.5-5 times the radius $r_1$ of the twist drill 1. The main rake face 14 preferably has a constant radius of curvature $r_2$ along the central axis C. In the shown embodiment, the radius of curvature $r_2$ is approximately 11.6 mm, i.e. approximately 2.6 times the radius $r_1$=4.5 mm of the twist drill.

In the embodiment shown in FIGS. 2-10, the twist drill 1 is configured as a single margin twist drill 1. The twist drill 1 thus has a margin 25 formed in the peripheral envelope surface 6, protruding from the land 8 behind the leading edge 20 of the land, i.e. behind the cutting edge 10 in the direction of rotation R of the twist drill 1. Behind the margin 25, the cylindrical envelope surface 6 is recessed with respect to the margin 25 in order to provide body clearance.

The twist drill is provided with two coolant channels 26 for providing coolant to the cutting edges 10 during machining, each opening in the respective clearance surface 15.

The invention is of course not limited to the embodiments disclosed, but may be varied and modified within the scope of the following claims.

The invention claimed is:

1. A twist drill for chip removing machining, the twist drill extending along a central axis of rotation and comprising:
   a front end and a rear end, between which a peripheral envelope surface extends, wherein the twist drill is rotatable in a direction of rotation around the central axis wherein the front end is formed as a drill point having two cutting edges and at least two clearance surfaces; and
   two helical chip flutes configured for conducting chips away from the cutting edges formed in the peripheral envelope surface and extending rearward from the front end, wherein each cutting edge extends in a transition between at least one of the clearance surfaces and one of the chip flutes, each cutting edge having a curved shape and extending from an inner position adjacent to the central axis to the peripheral envelope surface, wherein each cutting edge has a main portion which is closest to the peripheral envelope surface, each chip flute of the two helical chip flutes being delimited by a side surface including a main rake face, wherein the main rake face extends rearward from the main portion of the cutting edge, the main rake face having a concave shape as seen in a transverse cross section, wherein the cutting edges are contained in an imaginary conical surface, such that the twist drill is operable to generate a bottom profile having the shape of an inverted cone, and wherein the main portion of each cutting edge has a linear shape as seen in a front end view.

2. The twist drill according to claim 1, wherein, as seen in a transverse cross section, the main rake face has a radius of curvature which is at least 1.5 times as large as a radius of the twist drill.

3. The twist drill according to claim 1, wherein, as seen in a transverse cross section, the main rake face has a radius of curvature which is less than 5.0 times as large as a radius of the twist drill.

4. The twist drill according to claim 1, further comprising an axial rake angle that varies along each cutting edge from a minimum value at the inner position to a maximum positive value at the peripheral envelope surface.

5. The twist drill according to claim 1, wherein the front end has a foremost chisel edge extending through the central axis, wherein the chisel edge connects the cutting edges.

6. The twist drill according to claim 1, wherein each cutting edge includes a middle portion connected to the main portion, and an inner portion connected to the middle portion, wherein the middle portion has a convex shape as seen in the front end view.

7. The twist drill according to claim 1, wherein the inner portion of each cutting edge has a linear shape as seen in the front end view.

8. An exchangeable head for a twist drill for chip removing machining, the exchangeable head extending along a central axis of rotation and comprising:
a front end and a rear end, between which a peripheral envelope surface extends, wherein the exchangeable head is rotatable in a direction of rotation around the central axis, and wherein the rear end is configured for mounting in a front seat of a drill body, the front end being formed as a drill point having two cutting edges and at least two clearance surfaces; and
two helical chip flutes configured for conducting chips away from the cutting edges being formed in the peripheral envelope surface and extending rearward from the front end, wherein each cutting edge extends in a transition between at least one of the clearance surfaces and one of the chip flutes, each cutting edge having a curved shape and extending from an inner position adjacent to the central axis to the peripheral envelope surface, wherein each cutting edge has a main portion which is closest to the peripheral envelope surface, each chip flute being delimited by a side surface including a main rake face, wherein the main rake face extends rearward from the main portion of the cutting edge, the main rake face having a concave shape as seen in a transverse cross section, wherein the cutting edges are contained in an imaginary conical surface, such that, when the exchangeable head is mounted on a drill body to form a twist drill, the twist drill is operable to generate a bottom profile having the shape of an inverted cone, and wherein the main portion of each cutting edge has a linear shape as seen in a front end view.

9. A twist drill comprising:
a drill body; and
an exchangeable head according to claim 8 mounted in a front seat of the drill body, wherein the drill body extends rearward from the exchangeable head along the central axis.

* * * * *